United States Patent

Kobayashi

[15] 3,696,348

[45] Oct. 3, 1972

[54] INFORMATION WRITING CIRCUIT FOR MEMORY DEVICE

[72] Inventor: Tatsuo Kobayashi, Yokohama, Japan

[73] Assignee: E.R.D. Corporated, Tokyo, Japan

[22] Filed: April 20, 1970

[21] Appl. No.: 29,996

[52] U.S. Cl. ..340/174 AC, 340/174 NC, 340/174 M

[51] Int. Cl...............................G11c 5/08, G11c 7/02

[58] Field of Search....................340/174 M, 174 AC

[56] References Cited

UNITED STATES PATENTS 3,329,940 7/1967 Barnes et al. .......340/174 DA

OTHER PUBLICATIONS

IBM Technical Disclosure Bulletin Vol. 1, No. 6, Apr. 1959 pg. 40–41

*Primary Examiner*—James W. Moffitt
*Attorney*—Burgess, Ryan & Hicks

[57] ABSTRACT

In a three-dimensional current coincident mode memory plane, inhibit lines, common-inhibit-sense lines and/or sense lines are divided into a plurality of pairs of wirings so as to be selectively driven through an address decode matrix by drivers and gate switches.

2 Claims, 1 Drawing Figure

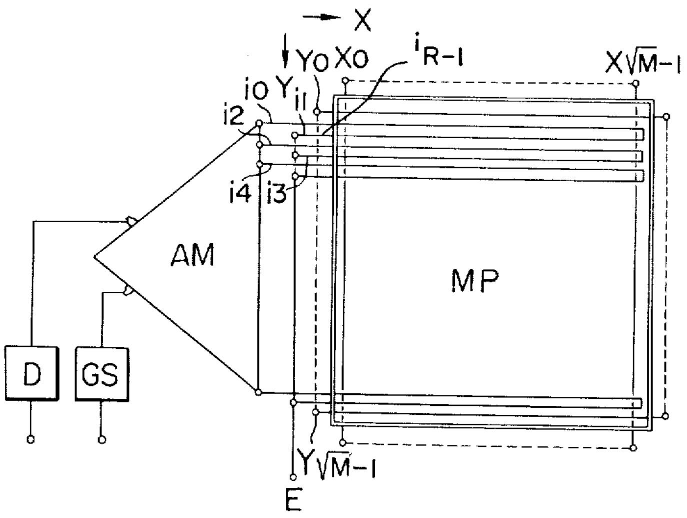
X
Y0
X0
$i_{R-1}$
X√M-1
i0
Y
i1
i2
i4
i3
AM
MP
D
GS
Y√M-1
E

INFORMATION WRITING CIRCUIT FOR MEMORY DEVICE

BACKGROUND OF THE INVENTION

The present invention relates to an improvement of magnetic core memory devices for use in electronic computers and electronic data processing systems or electronic information retrieval systems, and more particularly to an information writing circuit for magnetic core memory devices.

In electronic computers, magnetic core memory devices consisting of matrices of magnetic ferrite cores having a nearly rectangular hysteresis loop are muched used. Among the magnetic core memory devices are widely used the three-dimensional current coincident mode arrays in which ferrite cores are arrayed in $\sqrt{M}$ rows and columns to provide a memory plan having a storage capacity of M words having N bits length. The X and Y drive lines, inhibit lines and sense windings are threaded through the ferrite cores in a four-wire system in a manner well known in the art. Such arrays are stacked in as many core arrays or memory planes as there are digits in one word, with the X and Y drive lines passing through the same coordinates in all planes connected in series and with an external or peripheral selection circuit for driving these lines. In addition to the three-dimensional current coincident mode array, the linear selection mode array or "world-organized" arrangement and the two and half dimensional mode array are also employed in practice, but the three-dimensional current coincident mode array is preferred because a required number of external or peripheral circuits of the memory stack is the least of the above three modes.

The improvements of the three-dimensional current coincident mode magnetic core memory devices are required in order to provide a memory device having a higher speed and a greater storage capacity, but there arise many related problems. First, in a writing cycle, in which a current is made to flow through an inhibit line while a worst-case information pattern is written, an extremely high inhibit noise is induced in a sense winding through a core at which the inhibit line intercepts the sense winding, so that the next reading must be delayed until the inhibit noise is decayed sufficiently not to adversely affect the reading. Furthermore, the inhibit noise voltage saturates the sense amplifier, so that it will take a long time before the transistors or the like are restored to their initial state. Moreover, the inhibit line is generally threaded through 2,000 to 8,000 ferrite cores, so that the transmission characteristics of the drive lines are adversely affected, the waveforms are distorted, and a considerable delay time is encountered. The current through the inhibit line should flow coincidently with the writing pulse, thereby opposing or cancelling it. Therefore, it will be seen that the delay time in x or Y drive lines presents a very serious problem in the improvement of the cycle time of a high-speed magnetic core memory device.

Various attempts have been made to overcome these related problems. For example, a number of paired sense windings and/or inhibit lines is increased. Furthermore, one bit plane is made up of several smaller planes or mat planes. However, in a 128 × 128 ( =16, 384 words) bit plane used in practice, the inhibit lines can be divided only into eight pairs and the sense windings into four pairs at the most, from an economical viewpoint.

SUMMARY OF THE INVENTION

It is therefore the broad object of the present invention to provide an improved three-dimensional current coincident mode memory device.

it is another object of the present invention to provide an improved three-dimentional current coincident memory device having a large storage capacity and a high cycle time at less cost, all of which is impossible in prior art devices.

It is a further object of the present invention to provide a novel wiring arrangement of inhibit lines and a common inhibit-sense line which can substantially eliminate the defects encountered in the prior art arrangement, such as high noise signals caused during the information writing cycle, the degraded transmission characteristics caused when the inhibit line is driven, and so on.

In accordance with one embodiment of the present invention, the inhibit lines in one memory plane of the three-dimensional current coincident memory device are grouped into pairs each of which is driven through an address decode matrix by drivers and gate circuits, whereby the inhibit noise, the inhibit noise decay time, the inhibit line propagation delay time and the sense amplifier recovery time are all exceedingly reduced.

The above and other objects, features and advantages of the present invention will become more apparent from the following description of the preferred embodiment thereof, taken in conjunction with the accompanying drawing.

BRIEF DESCRIPTION OF THE DRAWING

The single FIGURE is a schematic diagram of an embodiment of the information writing circuit of the present invention.

DESCRIPTION OF THE PREFERRED EMBODIMENT

A memory plane MP of a three-dimensional current coincident mode having a memory capacity of M words is illustrated in the single FIGURE. X drive lines from $X_0$ to X $\sqrt{M-1}$ and Y drive lines from $Y_0$ to Y $\sqrt{M-1}$ are connected as shown in the figure. Inhibit drive lines $i_0$ to $i_{R-1}$ which are illustrated as extending in parallel with each other in the adjacent spaces between Y drive lines, are paired so that a total of R/2 pairs of inhibit drive lines are provided among the inhibit lines $i_0$ to $i_{R-1}$. The return of each pair of inhibit drive lines is used as an inhibit drive line. The inhibit drive lines thus paired are selectively driven through a decode matrix AM by drivers D and gate switches GS in response to the driving of the corresponding X and Y drive lines. Economically, a suitable number of drives D is $\sqrt{R/2}$ while a suitable number of gate switches GS is also $\sqrt{R/2}$. The drivers D and gate switches GS are opened and closed in response to the timing pulses used for driving an address selection circuit of X and Y drive lines. The number of pairs of inhibit drive lines is determined in accordance with the memory capacity, operation cycle time and economy.

Since the address selection matrix of the inhibit drive lines is driven by single polarity drive pulses, the diode matrix is the most economical and has improved electrical characteristics. For an ultra-high-speed memory device, a transistorized matrix may be employed. Other systems to be employed are the two-diode system in which diodes are connected to an input and output of a pair of inhibit drive lines, a system in which balance type transformers are connected to an input and output of a pair of inhibit lines so as to drive in phase, etc.

For the sake of better understanding of the present invention, the improvement of the electrical characteristics of the present invention over those of the prior art will be given below:

| | Prior art | Invention |
|---|---|---|
| Inhibit noise | 250 mv | 30 mv |
| Inhibit noise decay time | 100 n.sec. | 10 n.sec. |
| Inhibit line propagation delay time | 60 n.sec. | 10 n.sec. |
| Sense amplifier recovery time | 50 n.sec. | 10 n.sec. |

The data were obtained by the memory plane of 16,384 words in accordance with the prior art and the present invention. In the prior art system, a 128 × 128 memory plane was divided into four 64 × 64 mat planes through which were wired 32 × 128 inhibit lines. Two pairs of sense windings were wired in each mat plane independently and the sense windings in diagonally opposed mat planes were connected in series. The sense windings and inhibit lines were threaded through 4,096 cores. One sense winding as well as one inhibit line intercepted 1,024 ferrite cores. The core used was 20 mils in outer diameter, 12 mils in inner diameter and 5.5 mils in height and had a low temperature coefficient. Driving current was 375 mA and the pulse rising time was 50 n. sec or nanosecond.

In the arrangement of the present invention, four inhibit lines extending in parallel with X or Y drive lines were connected in series, thereby providing a total of 32 pairs of inhibit line connections. A 4 × 8 diode matrix was connected to the inputs and outputs of the inhibit line wirings. Four drivers D and 8 transistor gates Gs were used. Other conditions were similar to those of the prior art system.

The increase in cost of the memory device to which the present invention is applied is less than about 1 percent, but because of the reduction in inhibit noise decay time, the cycle time can be improved up to about 100 n.sec. Because of the reduction in drive propagation time, the cycle time can be improved up to about 60 n. sec. In addition to these improvements, because of the reduction in saturation recovery time in the sense amplifier, the overall cycle time can be improved as high as about 200 n. sec. This means that the cycle time of the memory device embodying the present invention is only about 25 percent of the cycle time of about 750 n.sec. of the prior art memory device having a bit length of 18. The improved cycle time of the present invention is almost equal to that obtained in the two and half dimensional mode memory device. However, in the two and half mode memory device having the same capacity, the number of peripheral drive circuits would be increased by about 30 percent with a large number of components, thus resulting in a decrease of reliability and dependability in operation.

The embodiment of the invention has been described with particular reference to the inhibit lines, but it will be readily understood that the improvements can be attained by applying the present invention to the wiring of the sense windings and the common inhibit sense wires by providing the decode matrix. The present invention, thus provides a high-speed magnetic memory device having a cycle time equivalent to that of the two and half mode device with a minimum increase in number of components and in cost. The cycle time of the writing circuit of the present invention is improved as much as 25 percent of the prior art systems.

The present invention has been so far described with particular reference to the preferred embodiment thereof, but it will be understood by those skilled in the art that variations and modifications can be effected without departing from the true spirit of the present invention as described hereinabove and as defined in the appended claims.

I claim:

1. A three-dimensional current coincident mode magnetic core device having groups of drive lines for conducting electricity, said three-dimensional core device comprising a plurality of planes of cores comprising n rows of cores, each of said planes having threaded therethrough X and Y drive lines, each of said planes having $n/2$ pairs of control lines wound through said $n$ rows of cores for conducting electricity, each of said control lines being common inhibit-sense lines and traversing one row and returning along an adjacent row, said X and Y drive lines being selectively actuated for addressing said core device, said control lines being wound in parallel on said plane with respect to said X or Y drive lines; and driving means connected to each of said $n/2$ pairs of control lines being responsive to the selected drive lines for selectively driving said $n/2$ pairs of control lines.

2. In a memory plane of a three-dimensional circuit as claimed in claim 1, wherein said driving means comprises an address decode matrix having inputs and a plurality of outputs each connected to a corresponding one of the pairs of $n/2$ control lines, a plurality of driving circuits and a plurality of gate circuits connected to corresponding inputs of said matrix, and input means connected to the driving circuits and the gate circuits for selectively energizing said circuits.

* * * * *